(12) United States Patent
Seki (10) Patent No.: US 6,746,032 B2
(45) Date of Patent: Jun. 8, 2004

(54) SUSPENSION STRUCTURE (75) Inventor: Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/167,466

(22) Filed: Jun. 13, 2002

(65) Prior Publication Data

US 2003/0006573 A1 Jan. 9, 2003

(30) Foreign Application Priority Data

Jun. 20, 2001 (JP) ........................ 2001-186335

(51) Int. Cl.⁷ ................................ B60G 9/02
(52) U.S. Cl. ............................... 280/124.135
(58) Field of Search .................. 280/124.135, 124.134, 280/124.136, 124.138, 124.139, 124.141, 124.142, 124.145

(56) References Cited

U.S. PATENT DOCUMENTS

| | | | | |
|---|---|---|---|---|
| 4,927,169 A | * | 5/1990 | Scaduto ................... | 280/5.521 |
| 5,062,655 A | * | 11/1991 | Sommerer ............ | 280/124.138 |
| 5,249,817 A | * | 10/1993 | Bruhl ................... | 280/124.137 |
| 5,348,337 A | * | 9/1994 | Ando ................... | 280/124.143 |
| 5,873,587 A | * | 2/1999 | Kawabe et al. ........ | 280/124.135 |
| 5,951,030 A | * | 9/1999 | Butler ................... | 280/86.751 |
| 6,027,130 A | * | 2/2000 | Kawabe et al. ........ | 280/124.135 |

FOREIGN PATENT DOCUMENTS

JP       63-48690       4/1988

* cited by examiner

Primary Examiner—Michael J. Carone
Assistant Examiner—M. Thomson
(74) Attorney, Agent, or Firm—Birch, Stewart, Kolasch & Birch LLP (57) ABSTRACT In a double wishbone suspension structure, a damper coupling part at one end of a damper is coupled to either of a pair of coupling shafts for coupling an upper arm or a lower arm and a knuckle. Since impact from a wheel is not applied to an intermediate part of an arm and no bending moment acts upon the arm, the arm is not required to be reinforced and can be significantly decreased in size and weight. A damper attachment for attaching a damper to the arm is not required and the number of parts and manufacturing costs can also be reduced.

18 Claims, 6 Drawing Sheets

SUSPENSION STRUCTURE

CROSS-REFERENCES TO RELATED APPLICATIONS

This nonprovisional application claims priority under 35 U.S.C. § 119(a) on Patent Application No. 2001-186335 filed in Japan on Jun. 20, 2001, the entirety of which is herein incorporated by reference.

FIELD OF THE INVENTION

The present invention relates to vehicular suspensions, and more particularly to a suspension structure favorable for decreasing structural weight and reducing the costs, e.g., of manufacture, of the suspension structure.

DESCRIPTION OF THE BACKGROUND ART

A double wishbone type suspension is a known vehicular suspension structure in the background art. For example, Japanese utility model publication No. Sho 63-48690, describes a "double wishbone type suspension."

In FIG. 2 of the above-mentioned publication, the suspension (numerals having a "'", e.g. 13', are referencing elements from JP 63-48690) includes a suspension arm having an upper arm 13' and a lower arm 14' attached to a body frame 1' (for a reference number, one used in the publication is described as it is). A cross member 15' for reinforcement is attached to the upper arm 13', a push-pull rod 12' is extended from a lower part of the cross member 15', and an end of the push-pull rod 12' is coupled to a cushion arm 7' via a link arm 9'. The cushion arm 7' is coupled to one end of a cushion unit 10' via a link arm 8' and the other end of the cushion unit 10' is attached to the body frame 1'.

In the above-mentioned suspension, the vertical motion of the upper arm 13' is converted to the elastic motion of the cushion unit 10'. However, the present inventors have determined that the above-mentioned art suffers from the following problems. A large bending moment acts upon the upper arm 13' when external force is applied to the cushion unit 10' via the upper arm 13' from a front wheel because the push-pull rod 12' is attached to an intermediate part of the upper arm 13'.

However, the cross member 15' is required to withstand the bending moment. The cross member 15' also functions as a coupling member for coupling the upper arm 13' to the cushion unit 10'. In addition, the push-pull rod 12', the link arm 9', the cushion arm 7' and the link arm 8' are required to couple the upper arm 13' and the cushion unit 10'.

As described above, since the reinforcement of the upper arm 13' is required to couple one end of the cushion unit 10' to the intermediate part of the upper arm 13' and multiple parts are required to attach the upper arm 13', the weight and cost of the suspension and the vehicle is substantially increased.

SUMMARY OF THE INVENTION

The present invention overcomes the shortcomings associated with the background art and achieves other advantages not realized by the background art.

An object of the present invention is to provide a reduced weight suspension structure at a reduced cost.

One or more of the objects of the invention is accomplished by a double wishbone suspension structure comprising a wheel side and a vehicle body side; a pair of upper arms and a pair of lower arms vertically swingably to the body side of the suspension structure, the upper and lower arms each having a first end and a second end, wherein the second ends are positioned on the vehicle body side of the suspension structure; an upper coupling shaft and a lower coupling shaft operatively connected to the respective first ends of the upper and lower arms; a knuckle on the wheel side being coupled to the respective first ends of the upper and lower arms via the respective upper and lower coupling shafts; a damper for dampening an impact transmitted from the wheel side to the vehicle body side; and a first end of the damper being coupled to either of the upper coupling shaft or the lower coupling shaft.

One or more of the objects of the invention are also accomplished by a double wishbone suspension structure comprising a wheel side and a vehicle body side; a pair of upper arms and a pair of lower arms vertically swingably to the body side of the suspension structure, the upper and lower arms each having a first end and a second end, wherein the second ends are positioned on the vehicle body side of the suspension structure; a coupling shaft operatively connected to at least one of the first ends; a knuckle on the wheel side being coupled to the at least one first end coupled with the coupling shaft; a damper for dampening an impact transmitted from the wheel side to the vehicle body side; and a first end of the damper being coupled to the coupling shaft.

One or more of the objects of the invention are also accomplished by a a double wishbone suspension structure comprising a wheel side and a vehicle body side; a pair of upper arms and a pair of lower arms vertically swingably to the body side of the suspension structure, the upper and lower arms each having a first end and a second end, wherein the second ends are positioned on the vehicle body side of the suspension structure; a coupling shaft operatively connected to at least one of the first ends; a knuckle having a pair of knuckle coupling parts on the wheel side being coupled to the at least one first end of the arm coupled with the coupling shaft;

a damper for dampening an impact transmitted from the wheel side to the vehicle body side; and a first end of the damper being coupled to the coupling shaft.

Since impact from the wheel is not applied to an intermediate part of the arm, the arm does not require reinforcement and the structure can be reduced in size and weight. The impact from the wheel is not applied to the intermediate part of the arm, because one end of the damper is coupled to a coupling shaft and no bending moment acts upon the arm. A damper attachment for attaching the damper to the arm is also not required. Accordingly, the number of parts can be reduced and the manufacturing cost of the arm can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
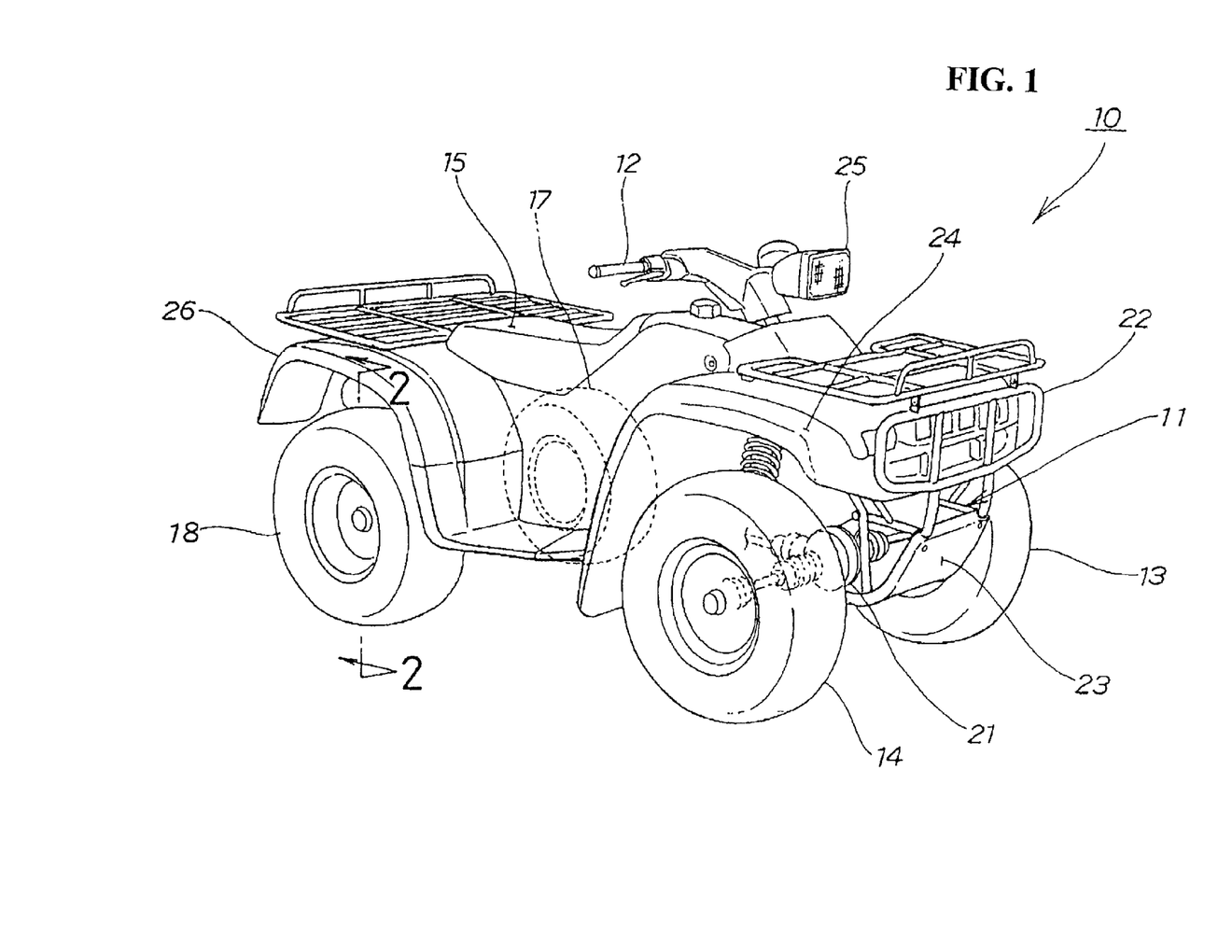
FIG. 1 is a perspective view showing a vehicle incorporating a suspension structure according to an embodiment of the present invention.
Figure 2:
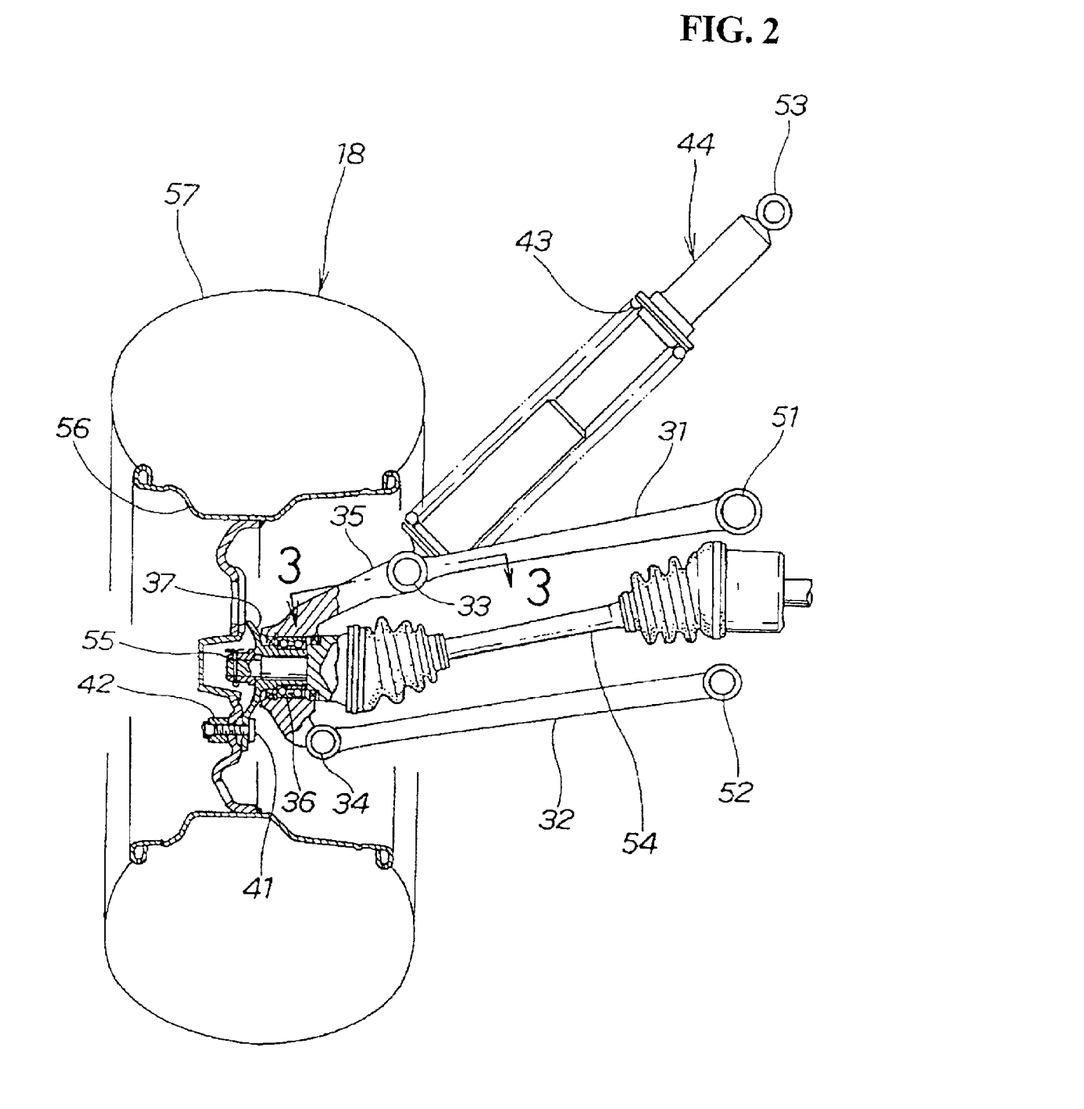
FIG. 2 is a cross-sectional view taken along a line 2—2 in FIG. 1.
Figure 3:
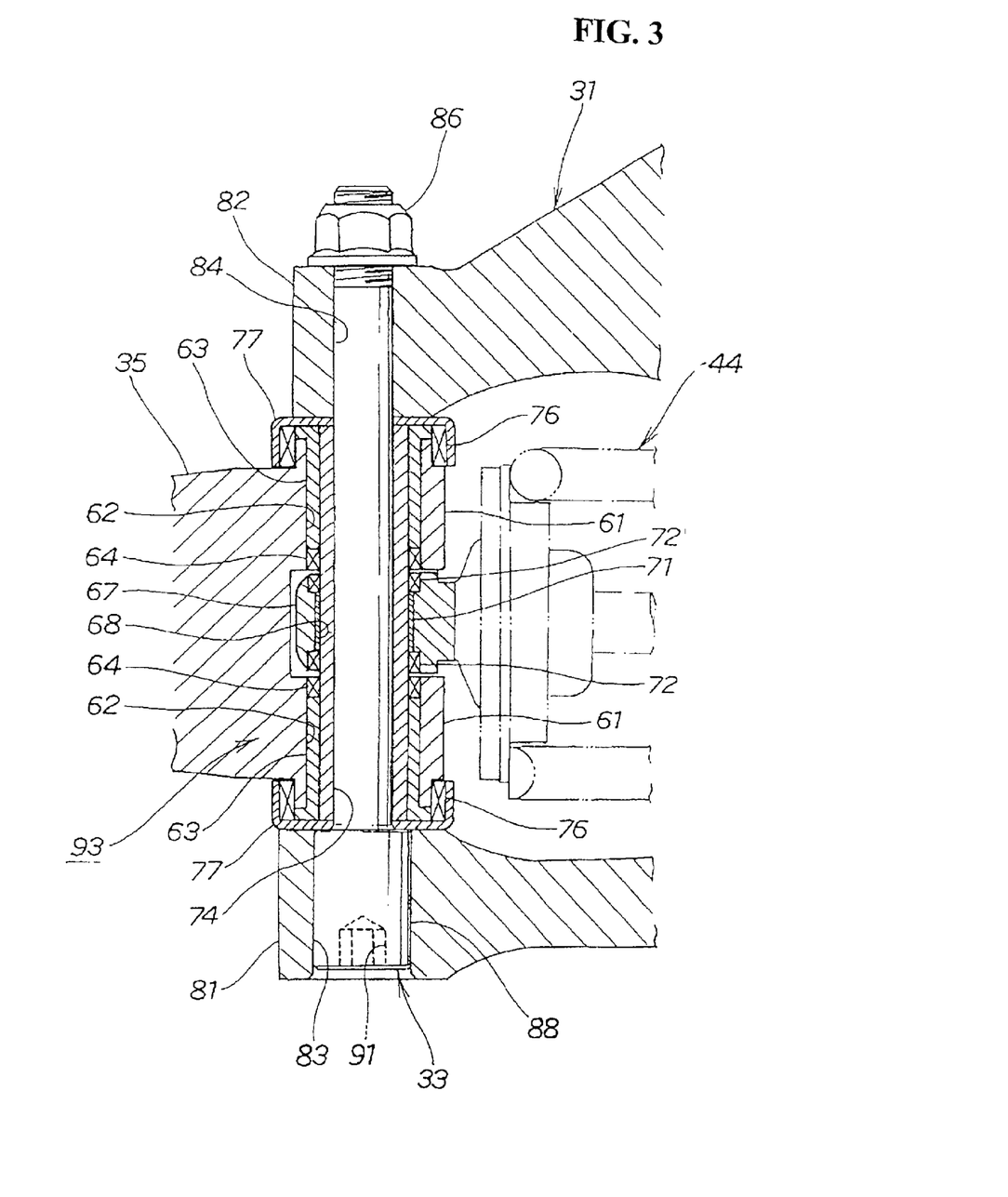
FIG. 3 is a cross-sectional view taken along a line 3—3 in FIG. 2.
Figure 4:
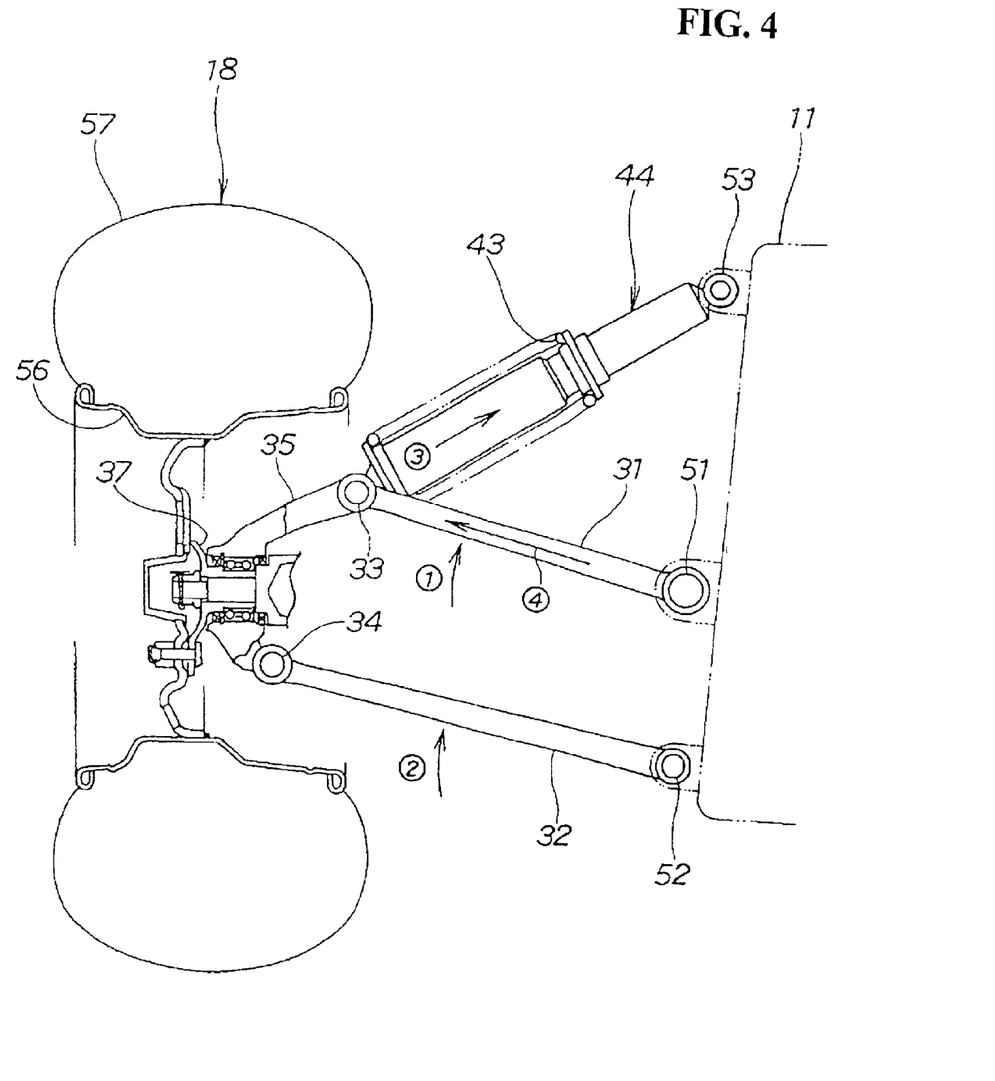
FIG. 4 is a partial sectional view of the suspension structure of the present invention showing an operating action of the suspension structure.
Figure 6:
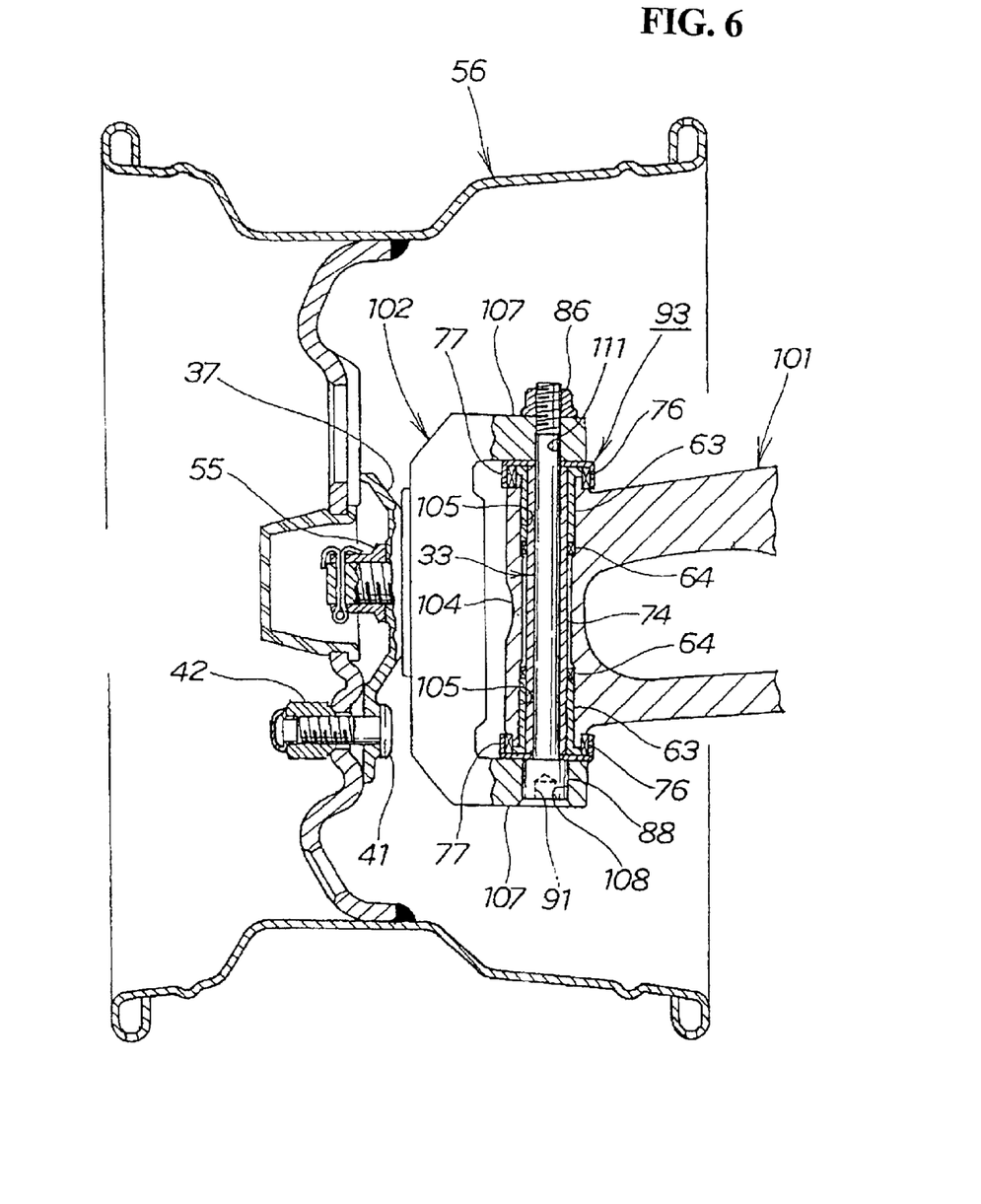
FIG. 6 is a sectional view showing a second embodiment of a suspension structure according to the present invention.

The present invention will hereinafter be described with reference to the accompanying drawings. The drawings should be viewed in a position that permits a proper reading of the reference numbers included in the respective drawing. FIG. 1 is a perspective view showing a vehicle incorporating a suspension structure according to an embodiment of the present invention. FIG. 2 is a cross-sectional view taken along a line 2—2 in FIG. 1. FIG. 3 is a cross-sectional view taken along a line 3—3 in FIG. 2. FIG. 4 is a partial sectional view of the suspension structure of the present invention showing an operating action of the suspension structure. FIG. 6 is a sectional view showing a second embodiment of a suspension structure according to the present invention.

FIG. 1 is a perspective view showing a vehicle 10 adopting a suspension structure according to an embodiment of the present invention. A vehicle 10 includes a handlebar 12 attached to a body frame 11 on the body side so that the handlebar and front wheels 13, 14 (the reference number 13 denotes a left front wheel and 14 denotes a right front wheel) coupled to the handlebar 12 via a steering system can be turned (not shown). The steering system permits the front wheel to be steered and attached to the body frame 11 via an arm described hereinafter.

A seat 15 is attached on the body frame 11 and rear wheels 17, 18 (the reference number 17 denotes a left rear wheel and 18 denotes a right rear wheel) are arranged below the seat 15 and driven together with the front wheels 13, 14 by a power unit. The power unit includes an engine and a transmission (not shown). The vehicle 10 also includes differential gears 21, a front bumper 22, an undercover 23, a front fender 24, a headlamp 25 and a rear fender 26 in a preferred embodiment.

FIG. 2 is a cross-sectional view taken along line 2—2 in FIG. 1. A double wishbone type suspension having an upper arm 31 and a lower arm 32 is provided, e.g., a pair of upper and lower arms attached to the body frame 11 at one end of each arm. Accordingly, the upper and lower arms can be swung vertically from the body frame 11. A knuckle 35 is attached to respective other ends of these upper arms 31 and lower arms 32 via a socket bolt 33 serving as a coupling shaft 34 so that the knuckle can be moved vertically. A hub 37 is attached to the knuckle 35 via a bearing 36 so that the hub can be turned. The right rear wheel 18 is attached to the hub 37 by a plurality of bolts 41 and nuts 42 (only one is respectively shown). One end of a damper 44 integrated with a suspension spring 43 for dampening impact so that the impact is not transmitted from the right rear wheel 18 to the side of the body frame 11 is also coupled to the socket bolt 33.

Swing shafts 51, 52 on the body frame 11 side of the of the upper arm 31 and the lower arm 32 and an attachment piece 53 for attaching the damper 44 to the body frame 11 are also provided with the body frame 11. A drive shaft 54 includes a first end coupled to the power unit and an other end coupled to the hub 37. A nut 55 secures the other end of the drive shaft 54 to the hub 37. A wheel 56 and a tire 57 make up the right rear wheel 18. Since the suspension on the side of the vehicle 10 around the left rear wheel 17 has an identical configuration to the suspension on the side of the vehicle 10 around the right rear wheel 18, the description thereof is omitted hereinafter. Accordingly, only the side of the vehicle 10 around the right rear wheel 18 will be described hereinafter in greater detail.

FIG. 3 is a cross-sectional view taken along line 3—3 in FIG. 2. As seen in FIG. 3, the knuckle 35 is coupled to the upper arm 31 via the socket bolt 33 and the damper 44 is coupled to the socket bolt 33. FIG. 3 shows that knuckle coupling holes 62, 62 are respectively made in two coupling parts 61, 61 provided at the end of the knuckle 35. Flanged bushes 63, 63 are respectively fitted into these knuckle coupling holes 62, 62, and dust seals 64, 64 are also respectively installed. A damper coupling hole 68 is made in a damper coupling part 67 provided at one end of the damper 44, a bush 71 is fitted into the damper coupling hole 68 and dust seals 72, 72 are installed on both sides of the bush 71.

FIG. 3 also shows that a cylindrical collar 74 is inserted inside one bush 63 of the knuckle 35, the bush 71 of the damper 44 and the other bush 63 in a state that the damper coupling part 67 of the damper 44 is arranged between the coupling parts 61, 61 of the knuckle 35. Dust seals 76, 76 are installed at each end outside the coupling parts 61, 61 of the knuckle 35. The knuckle 35 and the damper 44 are coupled by respectively covering these dust seals 76, 76, the end of each bush 63 and both ends of the collar 74 with end covers 77, 77.

Further, FIG. 3 shows that arm coupling holes 83, 84 are respectively made in two arm coupling parts 81, 82 provided at the end of each upper arm 31. Each coupling part of the knuckle 35 and the damper 44 is arranged between the arm coupling parts 81, 82. A socket bolt 33 is inserted into the arm coupling hole 83, the collar 74 and the arm coupling hole 84 from the side of the arm coupling part 81 of the upper arm 31. The knuckle 35 and the damper 44 are coupled to the upper arm 31 by screwing a nut 86 on a male screw provided at the end of the socket bolt 33.

Since the socket bolt 33 is provided with a head 88 inserted into the arm coupling hole 83, the socket bolt 33 and the nut 86 clamp the knuckle 35 between the end covers 77, 77 and the arm coupling part 82. The knuckle 35 is moved vertically by being slid between the collar 74 and the bush 63. The damper 44 is swung and is extended or contracted as it is slid between the collar 74 and the bush 71. A hexagonal drive socket 91 may also be provided to the head 88.

The bushes 63, 63, the dust seals 64, 64, the collar 74, the dust seals 76, 76, the end covers 77, 77, the socket bolt 33 and the nut 86 make up a coupling mechanism 93 for coupling the upper arm 31 and the knuckle 35. The damper 44 is coupled to the socket bolt 33 and the collar 74 forming the coupling mechanism 93 via the bush 71 and the dust seals 72, 72.

Next, the action of the above-mentioned suspension structure will be described. FIG. 4 is an explanatory view for explaining the action of the suspension structure according to the invention. For example, when the right rear wheel 18 is lifted or the body frame sinks due to loading with respect to the right rear wheel 18, the upper arm 31 and the lower arm 32 are respectively swung upward with swing shafts 51, 52 (as shown respectively by arrows 1 and 2). As a result, the damper 44 is contracted in a direction shown by an arrow 3. At this time, tensile force acts upon the upper arm 31 in a direction shown by an arrow 4. In a case where the upper arm 31 is swung downward with the swing shaft 51 (reverse situation to the above-mentioned case), compressive force acts upon the upper arm 31 in a direction reverse to the direction shown by the arrow 4.

Figure 5:
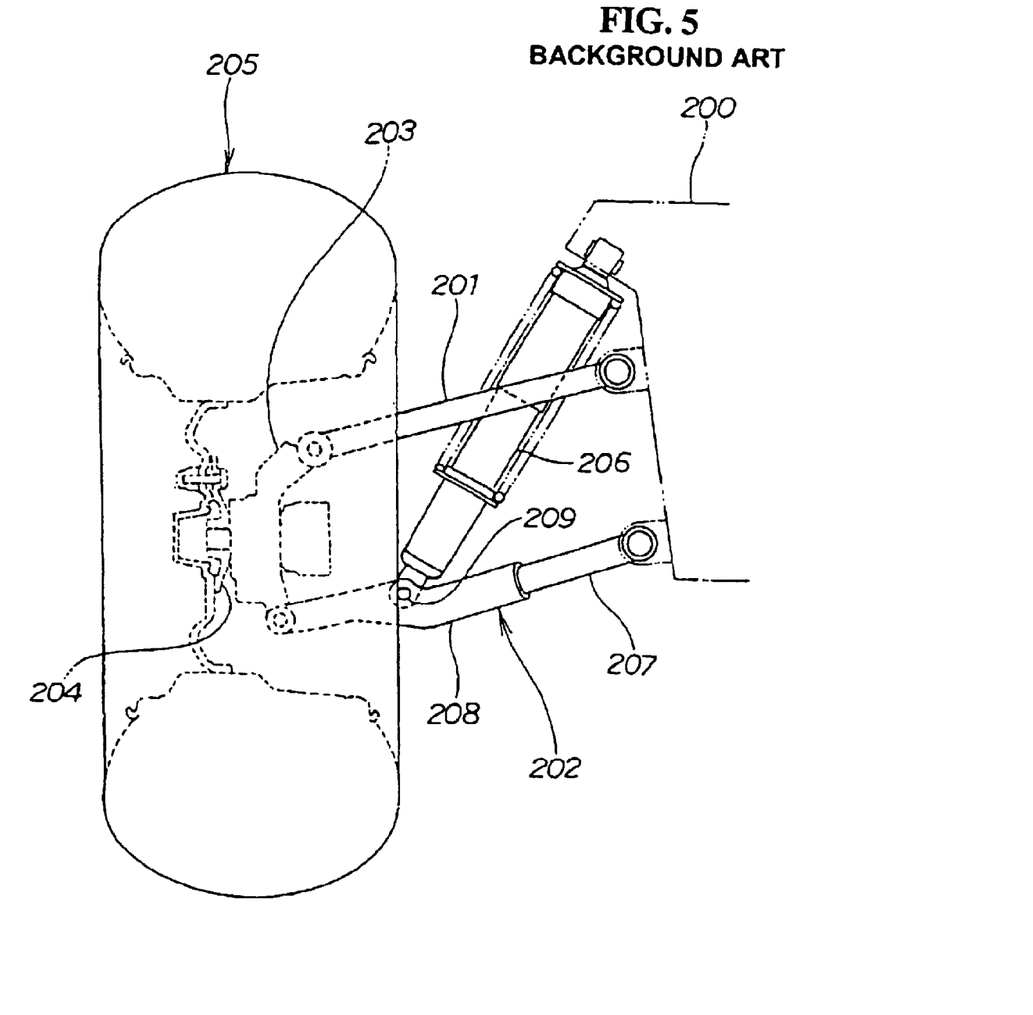
FIG. 5 is a front view showing a suspension structure according to an example of the background art.

FIG. 5 is a front view showing a suspension structure according to an example of the background art. A first end of an upper arm 201 and a lower arm 202 is attached to a body frame 200 so that they can be swung therefrom. A knuckle 203 is attached to each second end of these upper arms 201 and lower arms 202 so that the knuckle can be moved vertically. A hub 204 is attached to the knuckle 203 so that the hub can be turned and a wheel 205 is attached to the hub 204. A first end of a damper 206 is attached to an intermediate part of the lower arm 202 and the other end of the damper 206 is attached to the body frame 200.

However, the lower arm 202 includes an arm body 207 and a reinforcement tube 208 covering the arm body 207 to reinforce the arm body 207. A damper attachment 209 for attaching one end of the damper 206 is also provided with the tube for reinforcement 208. Since the damper 206 is attached to the intermediate part of the lower arm 202 as described above, the lower arm 202 is required to be reinforced by the reinforcement tube 208 so that the lower arm 202 can bear a large bending moment generated in the lower arm 202. This also requires the damper attachment 209 for attaching the damper 206 to the lower arm 202.

However, as described hereinabove with respect to FIG. 4, force in a longitudinal direction, such as tensile and compressive forces, acts upon the upper arm 31 because the upper arm 31 swings vertically from the frame 11. However, the bending moment experienced by the comparative example of FIG. 5 does not occur in the present invention. Therefore, since the upper arm 31 does not require reinforcement structure, the body frame 11 is substantially reduced in size and weight.

Since the socket bolt 33 and the collar 74 which couple the upper arm 31 and the knuckle 35 also function as an attachment for the damper 44, the damper attachment in the comparative example of FIG. 5 is not required in the simplified structure of the present invention.

As described in relation to FIGS. 2 and 3, a double wishbone type suspension structure in which a pair of upper arms 31 and lower arms 32 are attached to the body frame 11 so that the arms can be swung vertically therefrom. The knuckle 35 on a side of the right rear wheel 18 is coupled to each end of these upper arms 31 and lower arms 32 respectively via the coupling shafts 33, 34. The damper 44 for dampening impact transmitted from the right rear wheel 18 to the body frame 11 ranges from the body frame 11 to the side of the upper arm 31 (or the lower arm 32). The damper coupling part 67 at one end of the damper 44 is coupled to either of the coupling shafts 33 or 34.

Since impact from the right rear wheel 18 is not applied to the intermediate part of the upper arm 31 (or the lower arm 32) because the damper coupling part 67 of the damper 44 is coupled to either of the coupling shafts 33 or 34, no bending moment acts upon the upper arm 31 (or the lower arm 32) and the upper arm 31 (or the lower arm 32) does not require reinforcement. In addition, the upper arm 31 (or the lower arm 32) can be substantially reduced in size and weight.

Also, the damper attachment for attaching the damper 44 to the intermediate part of the upper arm 31 (or the lower arm 32) is not required and the number of parts can be reduced. Accordingly, the manufacturing costs of the upper arm 31 (or the lower arm 32) and that of the related suspension and body frame structure can be reduced.

FIG. 6 is a sectional view showing a second embodiment of a suspension structure according to the present invention. The same reference numbers are allocated to similar parts as that in the embodiment shown and described with respect to FIGS. 2 and 3. A detailed description of similar parts is omitted hereinafter. The second embodiment of the suspension structure includes a knuckle 102 coupled to an upper arm (or a lower arm) 101 via a coupling mechanism 93 (also see FIG. 3).

Arm coupling holes 105, 105 are made in an arm coupling part 104 provided to the end of the upper arm (or the lower arm) 101. Dust seals 64, 64 are respectively installed in these arm coupling holes 105, 105, flanged bushes 63, 63 are respectively fitted into these arm coupling holes, and a collar 74 is inserted inside the bushes 63, 63. Dust seals 76, 76 are respectively installed at both ends of the arm coupling part 104. The dust seals 76, 76, the end of each bush 63 and both ends of the collar 74 are covered with end covers 77, 77.

The arm coupling part 104 is arranged between two knuckle coupling parts 107, 107 provided to the knuckle 102. A socket bolt 33 is inserted into knuckle coupling holes 108, 111 made in each knuckle coupling part 107 through the knuckle coupling hole 108, the collar 74 and the knuckle coupling hole 111 from the side of the knuckle coupling hole 108. A nut 86 is screwed on a male screw at the end of the socket bolt 33.

Such structure may be also used for coupling the lower arm 32 and the knuckle 35 in the embodiment shown in FIG. 2. In addition, the suspension structure according to the invention may be also adopted in double wishbone type suspension for a front wheel and may be also adopted in a part for coupling each link and a knuckle in so-called multi-link double wishbone type suspensions that support the knuckle by a plurality of links to the body side.

The invention produces the following effect by the above-mentioned configuration. In the novel suspension structure of the present invention, one end of the damper is coupled to either of the coupling shafts for coupling a pair of upper and lower arms and each knuckle. Accordingly, impact from the wheel is not applied to the intermediate part of the arm, and a bending moment does not act upon the arm (as in the background art, e.g. FIG. 5). As a result, the arm does not require reinforcement and the arm, suspension and body frame can be reduced in size and weight. Also, the damper attachment for attaching the damper to the arm is not required and the number of required parts can also be reduced. Accordingly, the manufacturing cost of the arm, suspension and body frame can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A double wishbone suspension structure comprising:
   a wheel side and a vehicle body side;
   a pair of upper arms and a pair of lower arms vertically swingably connected to the body side of the suspension structure, said upper and lower arms each having a first end and a second end, wherein said second ends are positioned on said vehicle body side of said suspension structure;

an upper coupling shaft and a lower coupling shaft operatively connected to said respective first ends of said upper and lower arms;

a knuckle on the wheel side being coupled to the respective first ends of the upper and lower arms via the respective upper and lower coupling shafts;

a damper for dampening an impact transmitted from the wheel side to the vehicle body side; and a first end of the damper being coupled to either of the upper coupling shaft or the lower coupling shaft, wherein the first end of the damper coupled to the upper coupling shaft or the lower coupling shaft is coaxial with a central axis of the damper.

2. A double wishbone suspension structure comprising:

a wheel side and a vehicle body side;

a pair of upper arms and a pair of lower arms vertically swingably connected to the body side of the suspension structure, said upper and lower arms each having a first end and a second end, wherein said second ends are positioned on said vehicle body side of said suspension structure;

an upper coupling shaft and a lower coupling shaft operatively connected to said respective first ends of said upper and lower arms;

a knuckle on the wheel side being coupled to the respective first ends of the upper and lower arms via the respective upper and lower coupling shafts;

a damper for dampening an impact transmitted from the wheel side to the vehicle body side; and a first end of the damper being coupled to the lower coupling shaft.

3. The double wishbone suspension structure according to claim 1, wherein the first end of the damper is coupled to the upper coupling shaft.

4. The double wishbone suspension structure according to claim 1, wherein said suspension structure is a multi-link double wishbone suspension.

5. The double wishbone suspension structure according to claim 1, wherein said coupling shaft is a socket bolt secured to said knuckle with a nut.

6. The double wishbone suspension structure according to claim 1, said first end of the damper being coupled to said socket bolt.

7. The double wishbone suspension structure according to claim 1, further comprising a coupling mechanism, said coupling mechanism operatively connecting said knuckle and said respective upper and lower arm via a respective upper and lower coupling shaft.

8. The double wishbone suspension structure according to claim 7, said coupling mechanism including a pair of coupling parts provided in a position where said knuckle is operatively connected to said respective upper and lower coupling shaft;

a knuckle coupling hole within each of said coupling parts;

a flanged bush fitted within each of said knuckle coupling holes; and a socket bolt and nut, said socket bolt passing through said flanged bushes, said knuckle coupling holes and said coupling parts.

9. The double wishbone suspension structure according to claim 8, further comprising dust seals within said coupling mechanism.

10. The double wishbone suspension structure according to claim 7, said coupling mechanism including a damper coupling hole within a damper coupling part provided at the first end of the damper; and a bush having a pair of sides fitted within the damper coupling hole.

11. The double wishbone suspension structure according to claim 10, further comprising dust seals engaging both sides of the bush.

12. A double wishbone suspension structure comprising:

a wheel side and a vehicle body side;

a pair of upper arms and a pair of lower arms vertically swingably connected to the body side of the suspension structure, said upper and lower arms each having a first end and a second end, wherein said second ends are positioned on said vehicle body side of said suspension structure;

an upper coupling shaft and a lower coupling shaft operatively connected to said respective first ends of said upper and lower arms;

a knuckle on the wheel side being coupled to the respective first ends of the upper and lower arms via the respective upper and lower coupling shafts;

a damper for dampening an impact transmitted from the wheel side to the vehicle body side;

a first end of the damper being coupled to the lower coupling shaft; and a coupling mechanism, said coupling mechanism operatively connecting said knuckle and said respective upper and lower arm via a respective upper and lower coupling shaft said coupling mechanism including a pair of coupling parts provided in a position where said knuckle is operatively connected to said respective upper and lower coupling shaft;

a knuckle coupling hole within each of said coupling parts;

a flanged bush fitted within each of said knuckle coupling holes; and a socket bolt and nut, said socket bolt passing through said flanged bushes, said knuckle coupling holes and said coupling parts;

a damper coupling hole within a damper coupling part provided at the first end of the damper; and a bush having a pair of sides fitted within the damper coupling hole, said socket bolt operatively engaging said damper coupling hole and said bush.

13. The double wishbone suspension structure according to claim 12, further comprising a cylindrical collar being inserted between said flanged bushes of the knuckle and the bush of the damper, and said damper coupling part being arranged between the coupling parts of the knuckle.

14. The double wishbone suspension structure according to claim 8, further comprising:

an arm coupling part at an end of each upper and lower arm; and an arm coupling hole within each of said arm coupling parts, said coupling shaft operatively engaging said knuckle, said damper and said arm coupling holes.

15. The double wishbone suspension structure according to claim 13, further comprising:

an arm coupling part at an end of each upper and lower arm; and an arm coupling hole within each of said arm coupling parts, said socket bolt operatively engaging said knuckle, said damper and said arm coupling holes.

16. A double wishbone suspension structure comprising:

a wheel side and a vehicle body side;

a pair of upper arms and a pair of lower arms vertically swingably connected to the body side of the suspension structure, said upper and lower arms each having a first end and a second end, wherein said second ends are positioned on said vehicle body side of said suspension structure;

a coupling shaft operatively connected to at least one of said first ends;

a knuckle on the wheel side being coupled to the at least one first end coupled with the coupling shaft;

a damper for dampening an impact transmitted from the wheel side to the vehicle body side; and a first end of the damper being coupled to the coupling shaft, wherein the first end of the damper coupled to the coupling shaft is coaxial with a central axis of the damper.

17. A double wishbone suspension structure comprising:

a wheel side and a vehicle body side;

a pair of upper arms and a pair of lower arms vertically swingably connected to the body side of the suspension structure, said upper and lower arms each having a first end and a second end, wherein said second ends are positioned on said vehicle body side of said suspension structure;

a coupling shaft operatively connected to at least one of said first ends;

a knuckle having a pair of knuckle coupling parts on the wheel side being coupled to the at least one first end of the arm coupled with the coupling shaft;

a damper for dampening an impact transmitted from the wheel side to the vehicle body side; and a first end of the damper being coupled to the coupling shaft, wherein the first end of the damper coupled to the coupling shaft is coaxial with a central axis of the damper.

18. The double wishbone suspension structure according to claim 17, further comprising:

an arm coupling part provided at the first end of the arm between the knuckle coupling parts;

arm coupling holes within the arm coupling part;

dust seals respectively installed within the arm coupling holes;

flanged bushes respectively fitted into the arm coupling holes;

a collar inserted within the bushes; and a socket bolt inserted into knuckle coupling holes provided within each knuckle coupling part, the arm coupling holes and the collar, wherein said coupling shaft is formed by said socket bolt.

* * * * *